June 29, 1937. H. P. SPARKES 2,085,127
PHOTOSENSITIVE RELAY TOOL CONTROL
Filed Jan. 2, 1931

WITNESSES:

INVENTOR
Harry P. Sparkes.
BY
ATTORNEY

Patented June 29, 1937

2,085,127

UNITED STATES PATENT OFFICE 2,085,127

PHOTOSENSITIVE RELAY TOOL CONTROL

Harry P. Sparkes, Pittsburgh, Pa., assignor to Westinghouse Electric & Manufacturing Company, a corporation of Pennsylvania Application January 2, 1931, Serial No. 506,181

9 Claims. (Cl. 82—14)

My invention relates to photo-sensitive apparatus and has particular relation to relays of a type utilized for controlling the motion of the movable elements of dynamical systems.

It is an object of my invention to provide photo-sensitive apparatus for controlling the motion of the tool relative to the work piece in shaping apparatus.

Another object of my invention is to provide an automatic shaping device.

A specific object of my invention is to provide a lathe the tool of which is rendered automatically operable by a photo-sensitive system.

More specifically stated it is an object of my invention to provide for an automatic lathe of the type which incorporates a shaping tool adapted to operate on raw material, photo-sensitive apparatus so associated with the motivating element of the shaping tool as to cause it to move in the requisite direction at periods predetermined by the characteristics of the object that is being shaped.

In accordance with my invention, a template cam is provided that is supported coaxially with the raw material from which the cam is to be cut and is adapted to be rotated therewith. The cutting tool, whereby the cam is shaped, is supported on a platform adapted to be motivated by a motor, the rotor of which is controlled by a photo-sensitive system provided with a plurality of photo tubes.

The photo tubes associated with the photo-sensitive apparatus are secured on the platform on which the cutter is mounted and are adapted to be moved with the cutter. A source of radiant energy is mounted in such manner, relative to the template cam and to the photo tubes, that the template cam is capable of obstructing the radiant beam from the source to the photo tubes. The direction of motion of the platform, on which the photo tubes are mounted, is made responsive to the condition of excitation of the photo tubes, i. e., to the angular orientation of the template cam. Consequently, the motion of the cutter corresponds to the peripheral structure of the template cam.

Figure 1:
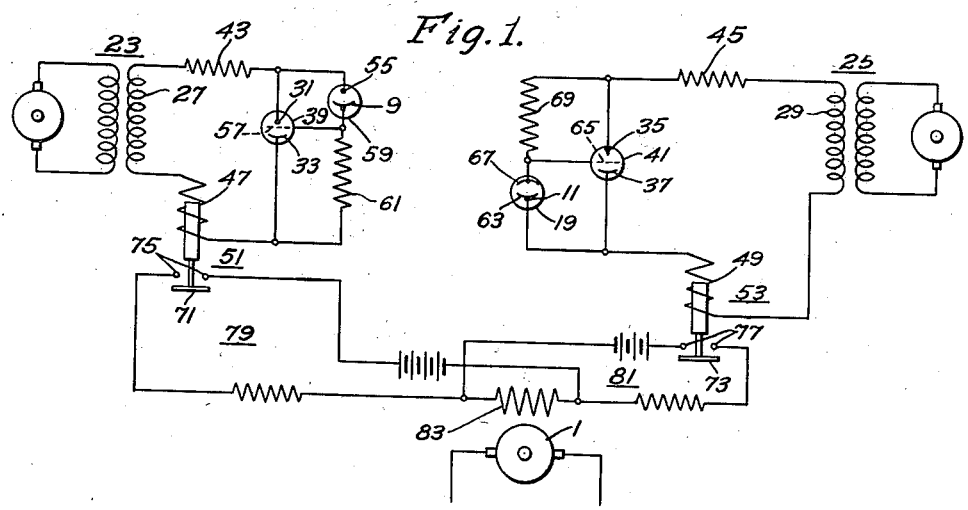
Figure 2:
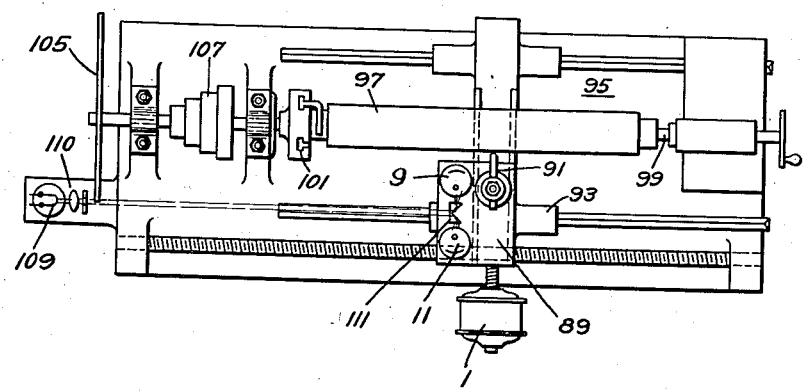

The novel features that I consider characteristic of my invention are set forth with particularity in the appended claims. The invention, itself, however, both as to its organization and method of operation, together with additional objects and advantages thereof, will best be understood from the following description of specific embodiments when read in connection with the accompanying drawing, in which:

Fig. 1 is a diagrammatic view illustrating the electrical circuit utilized in the practice of my invention, and Fig. 2 is a plan view showing a lathe constructed in accordance with my invention.

The circuit shown in Fig. 1 comprises a plurality of transformers 23 and 25 from the secondaries 27 and 29 of which a potential is impressed upon the principal electrodes 31 and 33, and 35 and 37 of the grid-controlled electric discharge devices 39 and 41. These grid-controlled electric-discharge devices may be grid-glow tubes, high vacuum thermionic tubes, grid-controlled gaseous discharge hot cathode tubes, grid-controlled mercury arc tubes or the like.

The anodes 31 and 35, of the tubes 39 and 41 are connected to the secondaries 27 and 29 of the transformers 25 and 27 through current-limiting resistances 43 and 45, and the cathodes 33 and 37 of the tubes are connected to the secondaries of the transformers through the exciting coils 47 and 49 of the relays 51 and 53.

The anode 31 of one tube 39 is connected to the anode 55 of a photo tube 9 while the control electrode 57 thereof is connected to the cathode 59 of the photo tube. A suitable impedance 61 is connected between the control electrode 57 of the electric-discharge device 39 and the cathode 33 thereof.

The cathode 37 of the other tube 41 is connected to the cathode 63 of a second photo tube 11 while the control electrode 65 of the tube 41 is connected to the anode 67 thereof. A suitable impedance 69 is also connected between the anode 35 of the electric-discharge device 41 and the control electrode 65 thereof.

It will be seen that one electric-discharge device 39 is associated with a photo tube 9 in such manner that it becomes conductive when the photo tube is illuminated while the other electric-discharge device 41 is so connected to its associated photo tube 11 that it becomes non-conductive when the photo tube is illuminated.

The relays 51 and 53, disposed in the principal circuits of the electric-discharge devices 39 and 41, are equipped with the movable contactors 71 and 73 that are adapted to engage a plurality of corresponding fixed contacts 75 and 77 to close circuits 79 and 81. The circuits include the field windings 83 of a motor 1 and, when they are closed an exciting current is supplied thereto. When one relay 51 is excited, the motor windings 83 are energized by current of one polarity, while, when the other relay 53 is excited, the windings 83 of the motor 1 are energized by a current of the opposite polarity.

It will be seen that, when both tubes 9 and 11, are excited, the relay associated with the electric-discharge device 39 will be energized, and the motor 1 will rotate in one direction; when neither tube is excited, the relay 41 associated with the other electric-discharge device will be energized, and the motor 1 will rotate in the opposite direction; and, when one tube 9 is excited and the other tube 11 is not, the field circuit 83 of the motor is open and the motor is at rest. It is, furthermore, seen that, for the reverse combination, that is, if the photo-tube 9 is not excited, and photo tube 11 is excited, the exciting potentials applied to the field winding 83 of the motor 1 are of opposite polarity to that just described, and the motor is at rest.

In the apparatus illustrated in Fig. 2, the photo tubes 9 and 11, connected in a circuit such as is shown in Fig. 1, are secured to a platform 89, whereon a shaping tool 91 is mounted. The tool 91 is disposed on the supporting bracket 93 of a lathe 95 in such manner as to be capable of engaging a cylinder 97 of raw material disposed between the centering point 99 and the chuck 101 of the lathe 95. The cylinder 97 is rotated by a suitable motor (not shown).

A second motor 1, such as is shown in Fig. 1, is geared to the platform 89 and is associated with the tubes 85 and 87 in the same manner as the motor 1 in Fig. 1. The motor 1 responds to the condition of the tubes 9 and 11 by moving the platform 89 in a direction transverse to the axis of rotation of the chuck.

A template 105, constructed of a convenient material, such as cardboard, and having substantially the contour desired, is mounted on the head 107 of the lathe 95 in such manner as to rotate with the cylindrical block 97 that engages the cutting tool 91. The model 105 is so disposed between the photo-tubes 9 and 11 and a source of light 109 that its angular position determines the condition of excitation of the photo tubes. The light from the source 109 is collimated by a lens 110 and divided and reflected into the cells by a prism 111 movable with the platform 89.

When the model 105 rotates, its edge tends to obstruct the light from the source 109. As a result of the rotation of the model 105, illumination of the tubes 9 and 11 undergoes a change. If both tubes 9 and 11 are in darkness, the platform 89 moves in an outward direction, if both tubes are illuminated, the platform moves inward, while, if one tube 11 is illuminated while the other tube 9 is in shadow, the platform does not move, and the tool 91 cuts an arc of a circle on the material 97.

As described hereinabove, my invention is applied to the cutting of a cam having a predetermined contour. It may also be applied to the cutting of a three dimensioned body having re-entrant surfaces, for example:

In such case, the model 105 is not disposed coaxially with the cylindrical piece 97 but is geared thereto. The model is, furthermore, made of such form that its angular positions correspond to the desired longitudinal positions of the cutting tool.

My invention has been illustrated as specifically applied to a particular system. It is, of course, not to be restricted to the system to which it has been applied as it has numerous advantages in other applications. My invention may be utilized in any situation where reciprocating motion is desirable and has particular utility in the field of electric hammers, for example.

Moreover, as described above, my invention has been applied to shaping, it may also be applied to grinding and to pattern cutting. In particular, it may be utilized to automatically operate a metal-cutting torch and to move it over a metallic plate in accordance with the structure of a pattern that is being cut out. In this connection, the binocular units are supported on the platform carrying the elements of the cutting torch.

The pattern, cut out of some suitable material, is disposed above the torch, and a source of light is disposed above the pattern. The binocular unit is connected to a motor 1 as is illustrated in Fig. 3 which, as a consequence, drives the torch in accordance with the peripheral structure of the pattern.

It is understood, of course, that the torch may be simply an electric terminal that moves above the plate and establishes an arc with a terminal below the plate. It is finally to be noted that specific circuits have been illustrated for the practice of my invention. It is a well known fact that the reversal of a motor may be accomplished in other ways than has been shown herein. My invention is not to be restricted to the particular circuits illustrated.

Although I have shown and described certain specific embodiments of my invention, I am fully aware that many modifications thereof are possible. My invention, therefore, is not to be restricted, except insofar as is necessitated by the prior art and by the spirit of the appended claims.

I claim as my invention:

1. Apparatus for shaping a work piece into an object having a predetermined cross-section comprising a tool, means for presenting successive elements of said work piece to the shaping edge of said tool, means for moving said tool relative to said work piece in a direction transverse to said work piece, a template the periphery of which corresponds to said predetermined cross-section, means for projecting a beam of radiant energy on the periphery of said template, means for moving said template and work piece in such manner that successive elements of said periphery are presented to said light beam, said elements corresponding to the elements of said work piece that are presented to the cutting edge of said tool, and means responsive to the resultant radiant energy emitted from said periphery for controlling the transverse movement of said tool.

2. Apparatus for shaping a work piece into a cylindrical object having a predetermined cross-section comprising a tool, means for rotating said work piece to present successive elements thereof to the shaping edge of said tool, means for moving said tool relative to said work piece in a direction transverse to said work piece, a template the periphery of which corresponds to said predetermined cross-section, means for projecting a beam of radiant energy on the periphery of said template, means for rotating said template in synchronism with said work piece whereby successive elements of said periphery are presented to said beam which correspond to the elements of said work piece presented to the cutting edge of said tool and means responsive to the resultant radiant energy emitted from said periphery for controlling the motion of said tool relative to said work piece.

3. Apparatus for shaping a work piece into an object having a predetermined cross-section comprising a tool, means for presenting successive elements of said work piece to the shaping edge of said tool, means for moving said tool relative to said work piece in a direction transverse to said work piece, a template the periphery of which corresponds to said predetermined cross-section, means for projecting a beam of radiant energy on the periphery of said template, means for moving said template and said work piece in such manner that successive elements of said periphery are presented to said beam, said elements corresponding to the elements of said work piece that are presented to the cutting edge of said tool, and means, including a plurality of photo-sensitive devices mounted to move with said tool and to receive the resultant radiant energy emitted from said periphery, for controlling the transverse movement of said tool to produce movement thereof except when one only of said devices receives said radiant energy.

4. Apparatus for shaping a work piece into an object having a predetermined cross-section comprising a tool, means for presenting successive elements of said work piece to the cutting edge of said tool, means for moving said tool relative to said work piece in a direction transverse to said work piece, a template the periphery of which corresponds to said predetermined cross-section, means for projecting a beam of radiant energy on the periphery of said template, means for presenting successive elements of said periphery to said light beam which correspond to the elements of said work piece that are presented to the cutting edge of said tool and means, including a plurality of photo-sensitive devices mounted to move with said tool and to receive the resultant radiant energy emitted from said periphery, for controlling the transverse movement of said tool, said photo-sensitive devices being so coupled to said transverse-moving means for said tool that said tool moves in a direction away from said work piece when the periphery of said template completely obstructs the radiant energy projected towards them, is at rest transversely to said work piece when sufficient radiation is transmitted from the periphery of said template to energize one of said photo-sensitive devices while another remains deenergized and moves in a direction toward said work piece when sufficient radiation is transmitted from the periphery of said template to energize all of said photo-sensitive devices.

5. Apparatus for shaping a work-piece into an object having a predetermined cross-section comprising a tool, means for presenting successive elements of said work piece to the shaping edge of said tool, means for moving said tool relative to said work piece in a direction transverse to said work piece, a template the periphery of which corresponds to said predetermined cross-section, means for projecting a beam of radiant energy on the periphery of said template, means for presenting successive elements of said periphery to said light beam which correspond to the elements of said work piece that are presented to the cutting edge of said tool and means including a plurality of photo-sensitive devices mounted to move with said tool and to receive the resultant radiant energy emitted from said periphery for controlling the transverse movement of said tool, said photo-sensitive devices being so coupled to said transverse-moving means for said tool that said tool moves in one direction transverse to said work piece when the periphery of said template completely obstructs the radiant energy projected towards them, is at rest transversely to said work piece when sufficient radiation is transmitted from the periphery of said template to energize one of said photo-sensitive devices while another remains deenergized and moves in the opposite direction transverse to said work piece when sufficient radiation is transmitted from the periphery of said template to energize all of said photo-sensitive devices.

6. Apparatus for shaping a work piece into an object having a predetermined cross-section comprising a tool, means for presenting successive elements of said work piece to the shaping edge of said tool, means for moving said tool relative to said work piece in a direction transverse to said work piece, a template the periphery of which corresponds to said predetermined cross-section, means for projecting a beam of radiant energy on the periphery of said template, means for moving said template and said work piece in such manner that successive elements of said periphery are presented to said beam, said elements corresponding to the elements of said work piece that are presented to the cutting edge of said tool, and means, including a plurality of photo-sensitive devices mounted to move with said tool and to receive the resultant radiant energy emitted from said periphery, for controlling the transverse movement of said tool to produce movement thereof in one direction when there is a certain relationship between the light impinging on one of said photo-sensitive devices and the light impinging on another of said devices, to produce movement thereon in another direction when there is another relationship between the light impinging on said photo-sensitive devices and to maintain said tool at rest when there is a third such relationship.

7. A control system for a machine tool comprising a source of radiation, a radiation-sensitive device adapted to receive said radiation, a guiding member adapted to selectively intercept said radiation, said radiation-sensitive device and said guiding member being arranged to move relative to one another according to the movement of the cutting tool, means for causing the absence of radiation during total interception thereof to actuate one feeding movement of said cutting tool, and means for causing the presence of radiation falling upon said radiation-sensitive device to actuate another feeding movement of said cutting tool according to the configuration of said guiding member.

8. A control system for a machine tool comprising a source of radiation, a photo-electric cell adapted to receive this radiation, a guiding member adapted to selectively intercept this radiation, said photo-electric cell and said guiding member being arranged to move relative to one another according to the movement of the cutting tool, means for causing the absence of radiation during total interception thereof to actuate one feeding movement of said cutting tool, and means for causing the presence of radiation falling upon said photo-electric cell to actuate another feeding movement of said cutting tool according to the configuration of said guiding member.

9. In a system of control for a machine for shaping work pieces in a desired manner, said machine having a cutting tool, a support therefor adapted to be moved in all directions for any selected plane of operation, in combination, an outline pattern, a source of radiant energy, means for causing a pencil of radiation to fall on said outline, radiation responsive means disposed to be affected by the modifications of the pencil of radiation by said outline pattern, a plurality of electric-discharge devices responsive to different operating characteristics of said radiation responsive means to selectively determine the direction of motion of said tool support to shape said work piece.

HARRY P. SPARKES.